B. F. FITCH.
MEANS FOR HOLDING REMOVABLE BODIES ON FREIGHT CARS.
APPLICATION FILED JUNE 28, 1920.
1,437,964.
Patented Dec. 5, 1922.
2 SHEETS—SHEET 1.
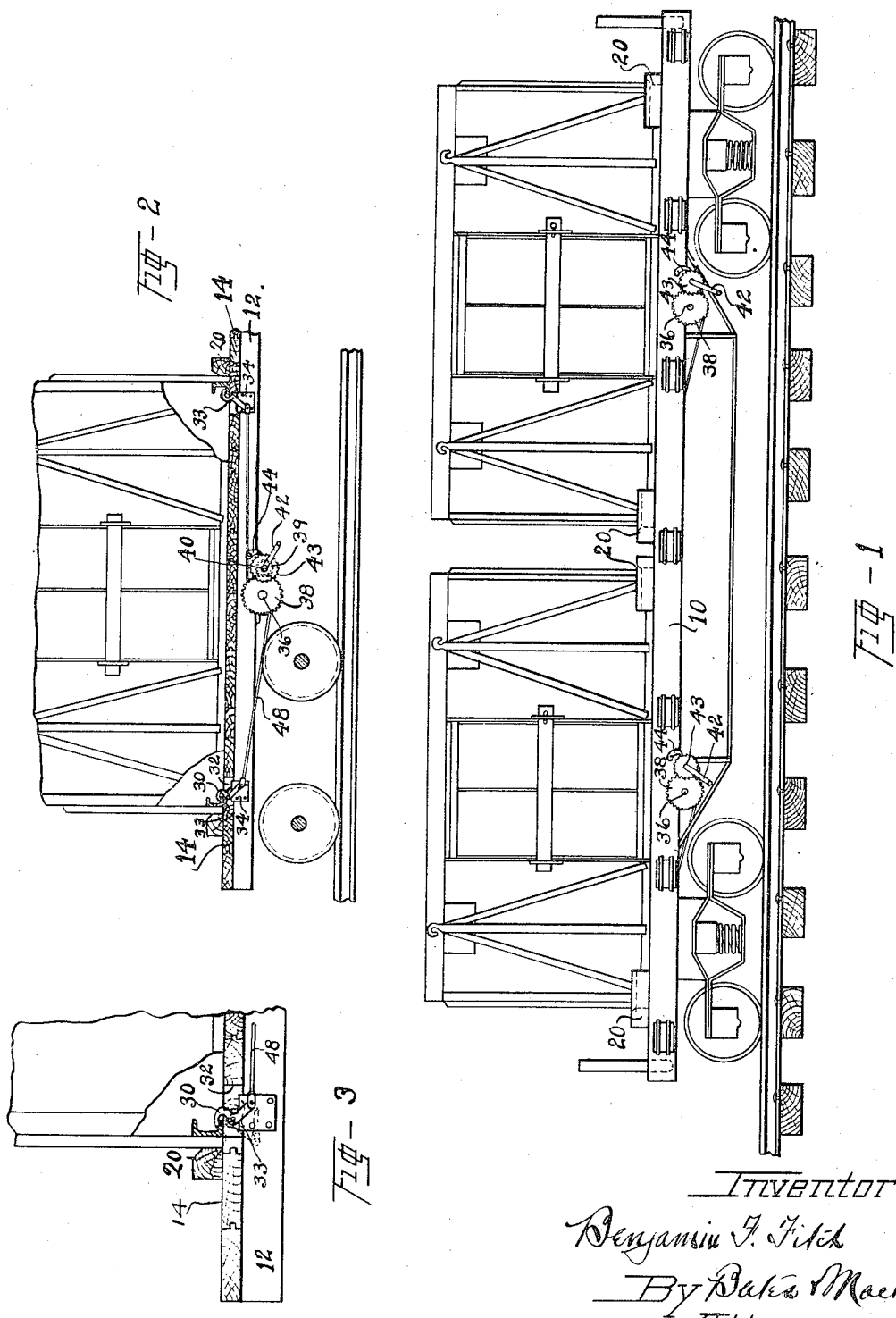
Inventor
Benjamin F. Fitch
By Baker Macklin
Attorneys

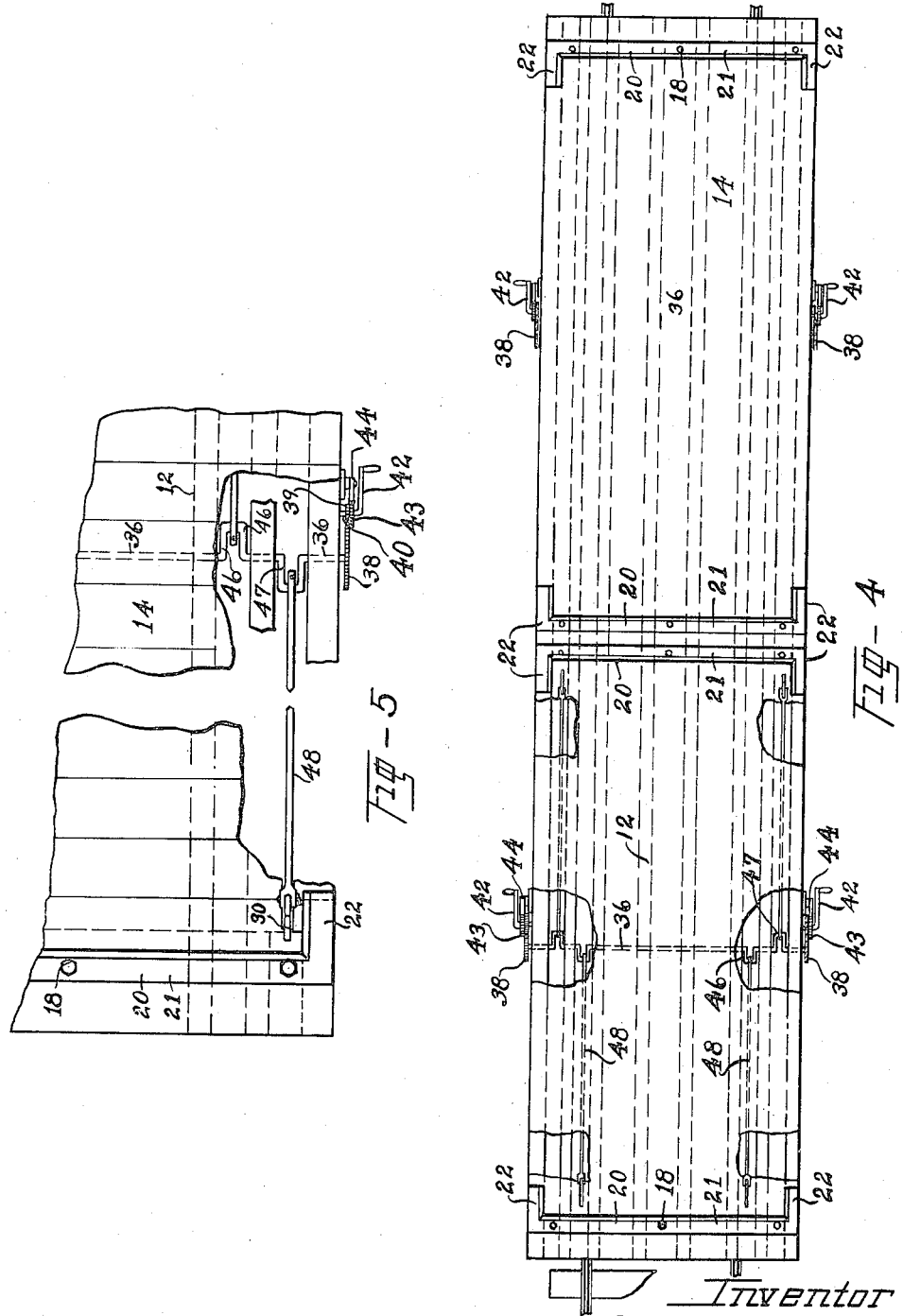

Patented Dec. 5, 1922.

1,437,964

UNITED STATES PATENT OFFICE.

BENJAMIN F. FITCH, OF EVANSTON, ILLINOIS.

MEANS FOR HOLDING REMOVABLE BODIES ON FREIGHT CARS.

Application filed June 28, 1920. Serial No. 392,336.

*To all whom it may concern:*

Be it known that I, BENJAMIN F. FITCH, a citizen of the United States, residing at Evanston, in the county of Cook and State of Illinois, have invented a certain new and useful Improvement in Means for Holding Removable Bodies on Freight Cars, of which the following is a full, clear, and exact description, reference being had to the accompanying drawings.

The object of this invention is to provide a simple and rugged construction for securing removable freight bodies such as are shown, described and claimed in my copending application, Serial No. 392,337, filed June 28, 1920, to railroad flat cars.

Essential features of a satisfactory securing means are sufficient strength and rigidity to prevent the freight bodies from working loose during transit, when the cars are frequently subjected to shocks and jolts of considerable violence, and that the securing means be capable of being readily engaged and disengaged when the freight bodies are being handled.

Other features and objects are hereinafter more fully described and the essential characteristics of my invention are summarized in the claims.

A preferred embodiment of my invention is illustrated in the accompanying drawings, wherein Fig. 1 is a side elevation, partly in section, of a flat car loaded with two freight bodies and equipped with the securing means constituting my invention; Fig. 2 is a section thru the car floor showing the securing means more clearly as applied to one freight body; Fig. 3 is a vertical section on a larger scale showing a clamping hook in engaging position; Fig. 4 is a plan of the mechanism shown in Fig. 1; Fig. 5 is a plan of a portion thereof on an enlarged scale.

Referring to the drawings by numerals, 10 designates a flat car body having sills 12 and flooring 14. Secured to the upper surface of the flooring, as by bolts 18, are transverse angle blocks 20 beveled on their inner edges and spaced to receive between each enclosing pair the ends of a freight body. The angle blocks 20 have short arms 22 extending longitudinally of the body of the car which with the transverse portions 21 constitute a sufficiently strong means to prevent endwise or lateral shifting of freight bodies enclosed within them on the car floor during shipment.

To prevent the freight bodies from being jolted out of their seats formed by the angle blocks 20, I provide clamping means, a satisfactory embodiment of which is illustrated in the drawings. The means shown comprises hook members 30 extending through slots 32 in the flooring 14 of the car adjacent to the corners of the freight bodies. The hooks 30 are each pivoted at 33 to brackets 34 secured to the flooring 14 adjacent to the slots 32. The hooks comprise angle members having arms of unequal length, the arms above the flooring 14 being adapted to engage the lower flange of inwardly facing transverse channel bars forming standard end reinforcing members of the freight body. The hooks 30 being pivoted below the floor are adapted to be dropped below the plane of the upper surface of the flooring, thus leaving an unobstructed surface on the car floor. This is a desirable feature, since the car may then be used for other purposes.

The four corner hooks 30 are adapted to be positioned individually over the flanges of a freight body deposited on the car and then tightened or released simultaneously. To accomplish this I provide means extending transversely beneath the car body, such means being centered preferably beneath each freight body. The means shown comprise a rod 36 having gears 38 secured at each end thereof at the sides of the car and engaged by a pinion 39 on a stub shaft 40. A suitable crank 42 is secured to each shaft 40 for turning the gears. A ratchet wheel 43 coacting with a retaining pawl 44, may be provided on the shaft 40.

The rods 36 are supported in bearings on the sills 12 of the car and are provided adjacent to each end with crank arms 46 and 47. These crank arms are connected by suitable rods 48 to the long arms of the hooks 30 depending through the car floor 14.

When a freight body has been deposited on the car and the hooks 30 adjusted over the channel flanges, as above described, the freight body may be clamped securely to the car floor by rotating the crank 42 at either side of the car as may be convenient, thereby securely clamping the four corners of the body to the car simultaneously. To release the freight body preparatory to its removal from the car the pawls need only be released whereupon the crank 42 may be turned in the opposite direction and the hooks 30 simultaneously released.

Having thus described my invention, I claim:

1. In combination with a freight car and a removable freight body supported thereon, clamping members extending beneath the floor of the car, means connecting the clamping members with a single crank shaft whereby all of said clamping members may be tightened or released simultaneously.

2. In a device of the character described, hooks pivoted to the floor of a railroad flat car, said hooks being adapted to removably engage the freight body, arms extending beneath the car floor and connected with a crank shaft extending transversely of the car, said crank shaft having means whereby it may be rotated in one direction and locked with all the hooks in clamping engagement with said freight body and rotated in the opposite direction releasing said hooks simultaneously.

3. In combination with a flat car and a removable freight body resting thereon, members adapted to embrace the ends of the freight body, and means for removably clamping said body to said car, said clamping means being provided with a pawl and ratchet whereby the members may be simultaneously tightened or released by means operable from either side of the car.

4. A device for removably securing a freight body to a railroad flat car, comprising hooks adapted to be individually positioned over a portion of the freight body frame, means for connecting said hooks to crank portions of a rod, extending transversely of the car beneath the freight body, and having pawl and ratchet means secured to the end thereof whereby said hooks may be simultaneously tightened or released from the side of the car.

5. In combination, a railroad flat car having angle blocks secured to the floor and adapted to embrace in an abutting engagement the ends of a removble freight body resting on said floor, and means for removably clamping said body to said floor, comprising members pivoted within brackets and having an arm adapted to be secured to the freight body and each having a second arm connected by a rod to a crank shaft extending beneath the center of the freight body, said crank shaft having means whereby said members may be tightened or released simultaneously from either side of the car.

6. In combination with a freight car and a removable freight body supported thereon, means for clamping said body to said car comprising hooks pivoted to the floor of the car adjacent to the corners of a freight body, each of said hooks having an arm adapted to engage a portion of the frame of the freight body, and a second arm connected by rigid means with a single crank shaft whereby all of said hooks may be tightened or released simultaneously.

7. In a device of the character described, hooks pivoted to the floor of a railroad flat car adjacent to the corners of a removable freight body resting thereon, said hooks having arms adapted to removably engage portions of the frame of the freight body and other arms extending downwardly through slots in the car floor and connected by members with a crank shaft extending transversely of the car beneath the freight body, said crank shaft having means at each end at opposite sides of the car whereby it may be rotated in one direction and locked with all the hooks in clamping engagement with said freight body and rotated in the opposite direction releasing said hooks simultaneously.

8. In combination with a flat car and a removable freight body resting thereon, blocks adapted to extend transversely of the car floor and closely embrace the ends of the freight body and means for removably clamping said body to said floor, said means comprising members adapted to be individually positioned over the interior portions of the freight body and simultaneously tightened or released by means operable from either side of the car.

9. In combination, a railroad flat car having angle blocks secured to the floor and adapted to embrace, in an abutting engagement, the ends of a removable freight body resting on said floor, and means for removably clamping said body to said floor comprising members pivoted to brackets secured to the car floor adjacent to the corners of the freight body, said members each having an arm adapted to be positioned over the flange of a structural member of the freight body and each having a second arm depending through a slot in the car floor connected by a rod to a crank shaft extending transversely of the car beneath the center of the freight body, said crank shaft having a crank and a ratchet at each end thereof whereby said members may be tightened or released simultaneously from either side of the car.

10. A device for removably securing a freight body to a railroad flat car, comprising hooks extending through the floor of the car adjacent to the corners of the freight body resting thereon, means whereby the hooks will be individually positioned over a portion of the freight body frame, means for connecting said hooks to crank portions of a rod extending transversely of the car beneath the freight body and having pawl and ratchet means secured to the end thereof, whereby said hooks may be simultaneously tightened or released from the side of the car.

11. The combination with a freight car and a removable body resting thereon, of members adapted to removably clamp the body to the car, ratchet means for operating the clamping members whereby the members may be tightened and released from either side of the car.

12. In combination, a freight car and a removable body resting thereon, of a member carried by the car and adapted to extend upwardly from the floor thereof and to engage the interior portion of the body, and means for operating said member.

13. In combination with a freight car, of a removable body adapted to rest thereon and having adjacent to its bottom a beam with an inward flange, and a member carried by the car and adapted to engage said flange to hold the body to the car.

14. The combination with a freight car of a removable body adapted to be supported thereon, means for holding the body in position on the car floor, said means comprising four members carried by the car and movable relatively thereto and arranged to engage the body adjacent the corners thereof, said means being adapted to simultaneously engage the body.

In testimony whereof, I hereunto affix my signature.

BENJAMIN F. FITCH.